(No Model.)
J. SPRUCE.
COCK FOR GAS AND WATER FIXTURES.
No. 305,638. Patented Sept. 23, 1884.
Fig. 1.
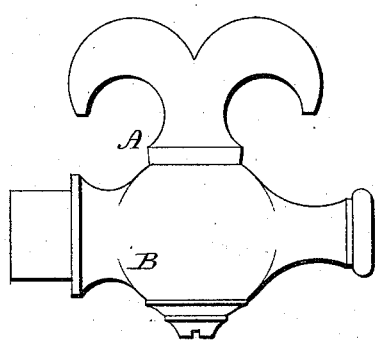
Fig. 3.     Fig. 2.     Fig. 4.
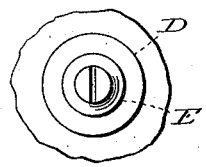 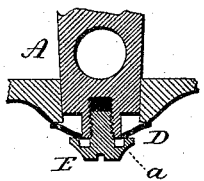 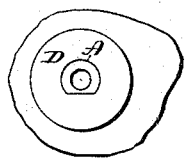
Fig. 6.     Fig. 7.     Fig. 5.
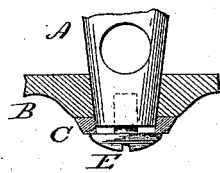 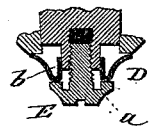 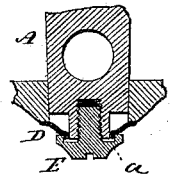
Witnesses.
James Spruce, Inventor
By Atty,

UNITED STATES PATENT OFFICE.

JAMES SPRUCE, OF WATERBURY, CONNECTICUT, ASSIGNOR TO THE SCOVILLE MANUFACTURING COMPANY, OF SAME PLACE.

COCK FOR GAS AND WATER FIXTURES.

SPECIFICATION forming part of Letters Patent No. 305,638, dated September 23, 1884.

Application filed April 5, 1884. (No model.)

*To all whom it may concern:*

Be it known that I, JAMES SPRUCE, of Waterbury, in the county of New Haven and State of Connecticut, have invented a new Improvement in Cocks for Gas and Water Fixtures; and I do hereby declare the following, when taken in connection with accompanying drawings and the letters of reference marked thereon, to be a full, clear, and exact description of the same, and which said drawings constitute part of this specification, and represent, in—

Figure 1, a side view of the cock complete; Fig. 2, a longitudinal section through the lower part of the plug, shell, and washer, showing the improvement; Fig. 3, an under side view; Fig. 4, an under side view showing the shape of the plug and opening in the washer; Fig. 5, same as Fig. 2, showing the washer depressed; Fig. 6, the usual construction; Fig. 7, a modification.

This invention relates to an improvement in cocks for gas and water fixtures, and like purposes, and particularly to that class commonly called "plug-cocks"—that is, cocks in which a conical-shaped plug is arranged transversely across the passage, with an opening through the plug which in one position will register with the opening through the cock, but turned from that position will close the opening. In this class of cocks the friction between the conical surface of the plug and its corresponding seat is very great, and should be made adjustable. This has been done by springs arranged at the smaller end of the plug, tending to draw the plug into its seat; but these springs have been more generally used in the larger classes of cocks, and of a helical shape, not practical in the smaller class, and liable to derangement by the working of the plug in the larger class. In the smaller class the more general construction has been to make a D-shaped washer to set on over the smaller end of the plug, which is made of corresponding shape, whereby the washer will turn with the plug, and then apply a screw into the end of the plug, the head of which will bear upon the washer and clamp it upon the under side of the shell to produce the required friction; but this is not a yielding pressure, and frequently interferes with the proper working of the plug, and especially is this the case in gas-cocks, where the plugs frequently set, or after a little use turn too hard, and can only be relieved by loosening the screw. The D-shaped washer is necessarily thick, in order to permit the adjustment of the plug, for the limit of adjustment is less than that of the washer. For illustration see Fig. 6, in which A represents the plug; B, the shell; C, the usual D-shaped washer set on over the end of the plug; E, the screw which runs into the end of the plug and bears upon the washer. The washer must engage the end of the plug, so as to turn with it; hence the extent of adjustment is the space which may be between the end of the plug and the head of the screw, for so soon as the head of the screw strikes the end of the plug no further adjustment can take place. For this reason a thick washer is necessary.

The object of my invention is to not only provide an elastic adjustment for the plug, but permit a very much greater range of adjustment than can be made even with the thick washer now employed, and to make the washer from thin sheet metal; and my invention consists in the construction as hereinafter described, and more particularly recited in the claims.

A represents the plug; B, the shell, of common construction. The end of the plug is made with one or more flat sides, as seen in Fig. 4, in the usual manner.

D is a thin sheet-metal washer, preferably made of concavo-convex shape, and of a diameter larger than the end of the plug, and so as to extend onto the surface of the shell, as seen in Fig. 2. Through the center of this disk is a hole corresponding to the non-cylindrical shape of the end of the plug A, as seen in Fig. 4.

E is the screw, the head of which is larger than the end of the plug A, and constructed to extend into the end of the plug, as seen in Fig. 2, in the usual manner of such adjusting-screws; but upon the under side of the head, around the body of the screw, a channel, *a*, is formed larger than the end of the plug. The washer is set onto the end of the plug, as seen in Fig. 2, and so that its irregular or non-cylindrical opening will fit onto the corresponding shape of the plug and engage it, so that if the plug is turned the washer will turn with it in the usual manner, then the screw E introduced to bear upon the outer surface of the washer. If the under surface of the head were flush throughout, it would directly come to a bearing on the end of the plug, and further adjustment would cease; but because of the recess or channel *a* in the under side of the head the screw may be turned farther into the plug, the extreme end of the plug passing into the channel *a*. The surrounding portion of the head bearing upon the washer will force it onto the plug, as seen in Fig. 5. The concavo-convex shape of the washer gives to it a considerable degree of elasticity, so that it serves as a spring-pressure upon the plug, the spring acting to draw the plug into its seat and hold it there with a yielding pressure, which yielding pressure may be adjusted by means of the screw E. Constructing the head of the screw with a channel upon its under side enables me to use a very thin sheet-metal washer, whereby I attain the elasticity.

Instead of making the channel or recess in the under side of the head of the screw, it may be made in the washer itself, as seen in Fig. 7. In this case a flange, *b*, is turned inward around the hole through the washer, the opening being the same shape as the end of the plug, and as before described. In this case the screw takes its bearing directly upon the washer, the flange permitting a considerable adjustment without loosening the elasticity of the washer. In this case, however, the adjustment may be greatly increased by constructing the head of the screw with the channel, as seen in Fig. 7.

By "concavo-convex shape of the washer" I wish to be understood as including any shape of substantially that character—that is to say, a washer in which the extreme outer edge shall bear upon the shell of the cock around the plug, and from the plane of the outer edge recede from the shell, as shown, by any considerable curvature which will give to the washer the required elasticity. The recess on the under side of the head may be employed with equal advantage in a thin non-elastic washer.

I claim—

1. In a plug-cock, the combination of the plug and shell with a washer having a non-circular opening through it corresponding to the non-cylindrical shape of the end of the plug, and a screw in the end of the plug, its head extending onto the washer and recessed upon its under side around the body of the screw, substantially as and for the purpose described.

2. In a plug-cock, the combination of the plug and shell with a concavo-convex washer having a non-circular opening through it corresponding to the non-cylindrical shape of the end of the plug, and a screw in the end of the plug, its head extending onto the washer, the said head recessed upon its under side around the body of the screw, substantially as and for the purpose described.

3. In a plug-cock, the combination of the plug and shell, the plug constructed with a non-cylindrical end, a sheet-metal concavo-convex washer having an opening through it corresponding to said non-cylindrical end of the plug, constructed with a flange around said opening, and a screw in the end of said plug, the head of which bears upon said washer around said opening, substantially as described.

JAMES SPRUCE.

Witnesses:
C. M. DE MOTT,
T. R. HYDE, Jr.